United States Patent
Yakovlev et al.

(10) Patent No.: US 11,729,215 B2
(45) Date of Patent: Aug. 15, 2023

(54) METHOD FOR INSPECTION AND FILTERING OF TCP STREAMS IN GATEWAY ROUTER

(71) Applicant: F-Secure Corporation, Helsinki (FI)

(72) Inventors: Yury Yakovlev, Helsinki (FI); Tero Kilkanen, Helsinki (FI); Markus Palonen, Helsinki (FI)

(73) Assignee: F-Secure Corporation, Helsinki (FI)

( * ) Notice: Subject to any disclaimer, the term of this patent is extended or adjusted under 35 U.S.C. 154(b) by 241 days.

(21) Appl. No.: 16/868,233

(22) Filed: May 6, 2020

(65) Prior Publication Data
US 2020/0358821 A1    Nov. 12, 2020

(30) Foreign Application Priority Data

May 7, 2019 (GB) .................................. 1906412

(51) Int. Cl.
*H04L 9/40* (2022.01)
*H04L 45/42* (2022.01)
*H04L 47/2466* (2022.01)
*H04L 69/163* (2022.01)
*H04L 69/16* (2022.01)

(52) U.S. Cl.
CPC ............ *H04L 63/166* (2013.01); *H04L 45/42* (2013.01); *H04L 47/2466* (2013.01); *H04L 63/0227* (2013.01); *H04L 63/0236* (2013.01); *H04L 63/1441* (2013.01); *H04L 63/20* (2013.01); *H04L 69/163* (2013.01); *H04L 69/169* (2013.01)

(58) Field of Classification Search
CPC ... H04L 63/166; H04L 45/42; H04L 47/2466; H04L 63/0236; H04L 63/20; H04L 63/1441; H04L 69/169; H04L 63/0227; H04L 69/163
See application file for complete search history.

(56) References Cited

U.S. PATENT DOCUMENTS 7,546,371 B1   6/2009 Cheng et al.
9,252,972 B1 * 2/2016 Dukes ..................... H04L 45/64
(Continued)

FOREIGN PATENT DOCUMENTS

EP    2590379 A2   5/2013
GB    2420244 A    5/2006

OTHER PUBLICATIONS

Search Report for GB1906412.0 dated Oct. 18, 2019.

*Primary Examiner* — Cheng-Feng Huang
(74) *Attorney, Agent, or Firm* — Thomas | Horstemeyer, LLP

(57) ABSTRACT

A method of monitoring traffic by a router acting as a gateway between a first and second network is described. The router can receive data packets sent from the first device over the TCP connection and can send a TCP ACK packet to the first device in response to each data packet. The data packets can be stored without sending them to the second device. The stored data packets can be examined in order to determine whether to block or allow the TCP connection. In the event that it is determined to allow the TCP connection, the router can send each of the stored data packets to the second device. In the event that it is determined to block the TCP connection, the router can send a TCP RST message to each of the first and second devices in order to close the TCP connection.

9 Claims, 2 Drawing Sheets

(56) References Cited

U.S. PATENT DOCUMENTS

| | | | |
|---|---|---|---|
| 2002/0091844 A1* | 7/2002 | Craft | H04L 69/162 |
| | | | 719/321 |
| 2004/0062246 A1* | 4/2004 | Boucher | H04L 61/10 |
| | | | 709/236 |
| 2004/0111523 A1* | 6/2004 | Hall | H04L 67/1097 |
| | | | 709/230 |
| 2011/0264905 A1* | 10/2011 | Ovsiannikov | H04L 63/0281 |
| | | | 713/151 |
| 2012/0260307 A1* | 10/2012 | Sambamurthy | H04L 63/105 |
| | | | 726/1 |
| 2014/0337614 A1* | 11/2014 | Kelson | H04L 63/166 |
| | | | 713/152 |
| 2015/0032691 A1* | 1/2015 | Hall | H04L 47/193 |
| | | | 707/610 |
| 2015/0365378 A1* | 12/2015 | Kim | H04L 47/323 |
| | | | 726/13 |
| 2017/0346854 A1* | 11/2017 | Kumar | H04W 12/02 |
| 2019/0182286 A1* | 6/2019 | Zini | H04L 63/1416 |

* cited by examiner

METHOD FOR INSPECTION AND FILTERING OF TCP STREAMS IN GATEWAY ROUTER

CROSS-REFERENCE TO RELATED APPLICATIONS

This application claims priority to, and the benefit of, British application no. 1906412.0, filed May 7, 2019, herein incorporated by reference in its entirety.

FIELD OF THE INVENTION

The present invention relates to monitoring and filtering of TCP streams in a router.

BACKGROUND

A typical connection between a LAN (local area network) and WAN (wide area network, such as the Internet) involves a router that forwards data packets between devices on the LAN and devices on the WAN.

Routers are typically implemented as dedicated hardware devices, as shown schematically in FIG. 1. The router 100 has a connection 101 to the LAN, and a connection 102 to the WAN. The router contains a CPU 103 (plus memory, etc, not shown) which runs an operating system (OS), and on which generic software can be run (in either user mode or kernel mode of the OS), and an ASIC (application specific integrated circuit) or other single purpose processor 104 which implements some of the routing functions.

Typically, when traffic passing between the LAN and the WAN (or vice versa) is received by the router, the aim is to perform as little processing as possible using the CPU 103, and offload as much of the processing as possible to the ASIC 104. This is because the ASIC will generally be significantly faster than the CPU—as such the ASIC processing is often termed the "fast path".

The router is (generally) a single point through which all traffic between the LAN and the WAN passes. As such, it is desirable to implement packet monitoring on the router. As previously stated, CPU 103 can run generic software, so traffic monitoring software can be made to run on the CPU of a variety of routers with only minimal changes (e.g. to compensate for differences in the operating systems of the routers). However, this requires the traffic between the LAN and the WAN to be handled by the (slow) CPU, rather than the (fast) ASIC, which significantly reduces the throughput of the router. For a gigabit (1,000 Mb/s) router, throughput rates from currently available filtering running on the CPU is typically 200 to 400 Mb/s.

Improvements to throughput can be achieved by running the packet monitoring and filtering either as a "kernel mode" application on the CPU, or by implementing it in the ASIC, but this results in the application no longer being easily portable between different models of router.

SUMMARY

According to a first aspect of the invention, there is provided a method of monitoring traffic, the method being carried out by a router acting as a gateway between a first and second network, the method comprising: after establishment of a TCP connection between a first device on the first network and a second device on the second network: receiving a plurality of data packets sent from the first device over the TCP connection; sending a TCP ACK packet to the first device in response to each data packet of the plurality of data packets; storing said data packets without sending them to the second device; examining at least part of the plurality of the stored data packets in order to determine whether to block or allow the TCP connection; in the event that it is determined to allow the TCP connection: sending each of the stored data packets to the second device; in the event that it is determined to block the TCP connection: sending a TCP RST message to each of the first and second devices in order to close the TCP connection.

The router may have a first processor and a second processor, and the steps of claim 1 may be performed on the first processor, and, in the event that it is determined to allow the TCP connection, the method may further comprise handling subsequent data packets of the TCP connection via the second processor.

In the event that it is determined to block the TCP connection, the method may send a substitute response to the first device via the TCP connection prior to sending the TCP RST message, the substitute response containing one or more data packets using the same application layer protocol as the stored data packets.

In the event that it is determined to block the TCP connection, the method may further comprise discarding the stored data packets.

Following sending of the TCP RST message, the method may further prevent forwarding of any further data packets between the first and second device.

According to a second aspect of the invention, there is provided a router comprising: a first port configured to connection to a first network; a second port configured to connect to a second network; a memory unit for storing data; a first processor configured to: after establishment of a TCP connection between a first device on the first network and a second device on the second network: receive a plurality of data packets sent from the first device over the TCP connection; send a TCP ACK packet to the first device in response to each data packet of the plurality of data packets; store said data packets in the memory unit without sending them to the second device; examine the stored data packets in order to determine whether to block or allow the TCP connection; in the event that it is determined to allow the TCP connection: send each of the stored data packets to the second device; in the event that it is determined to block the TCP connection:
send a TCP RST message to each of the first and second devices in order to close the TCP connection.

The router may further comprise a second processor configured to forward data packets between the first and second port, wherein the router may further be configured to handle data packets using the second processor for a TCP connection following a determination at the first processor to allow that TCP connection.

DETAILED DESCRIPTION

Figure 1:
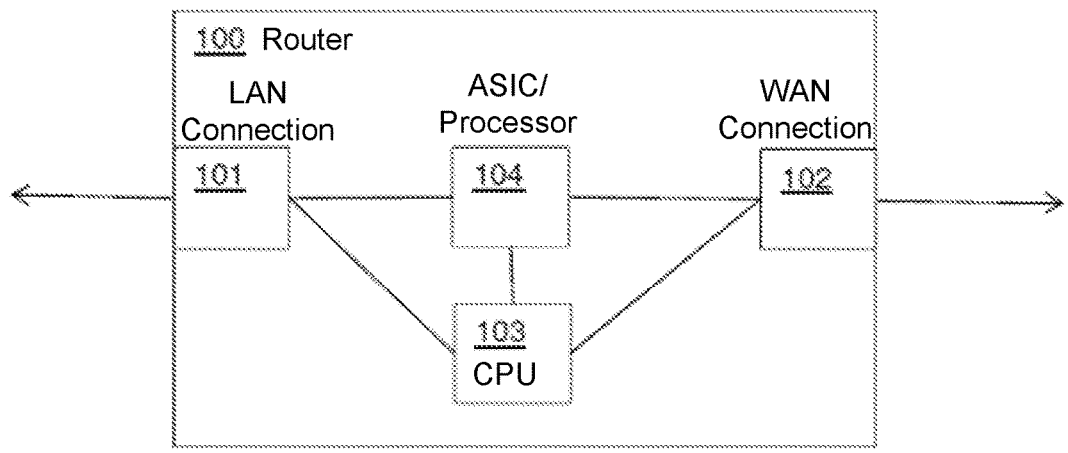
FIG. 1 is a schematic illustration of a router.
Figure 2A:
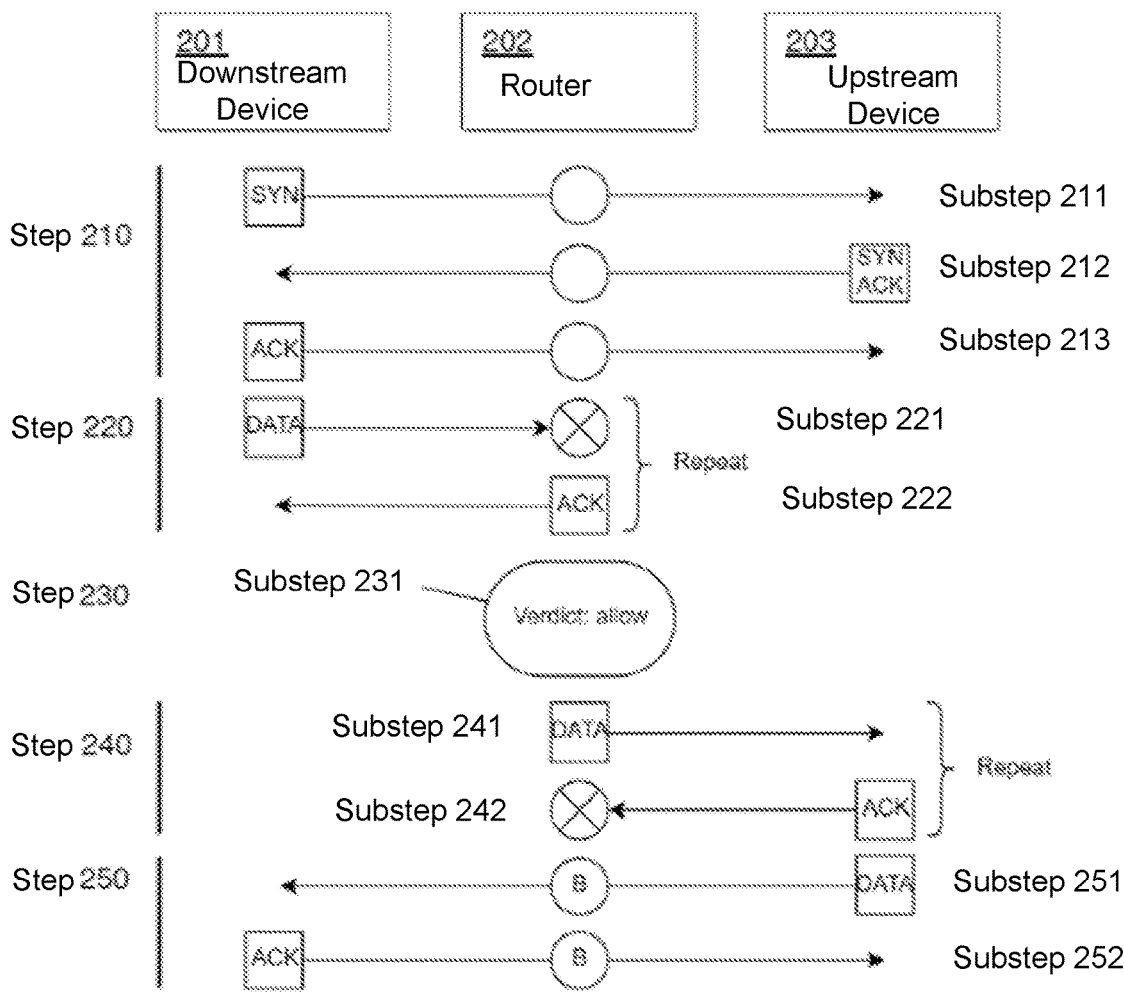
FIGS. 2A and 2B show flows in a network during a TCP connection.
Figure 2B:
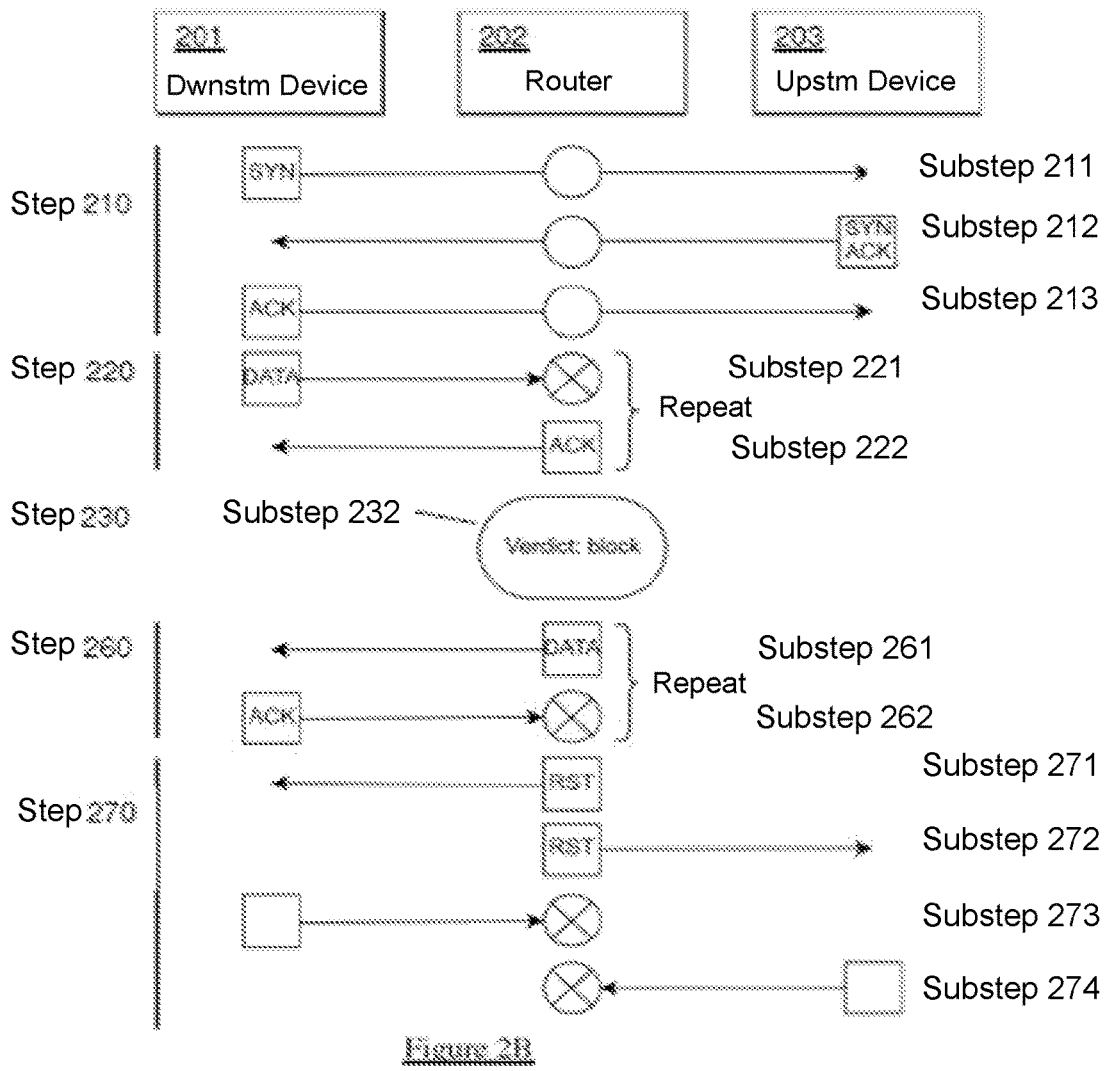

FIGS. 2A and 2B show network flows between a downstream device 201 in a LAN, a router 202, and an upstream device 203 in a WAN. It will be appreciated that while these figures show a connection initiated by the downstream device, the same procedures could also be applied to connections initiated by the upstream device.

FIG. 2A shows the network flow for safe traffic, and FIG. 2B shows the flow for malicious or suspicious traffic. Steps 210 and 220 are identical in both cases. In step 210, a TCP connection is established between the downstream device 201 and the upstream device 203, via the router 202. Step 210 comprises substeps of:

(211) the downstream device sending a SYN packet to the upstream device, which is forwarded by the router and received by the upstream device;

(212) the upstream device sending a SYN/ACK packet in response, which is forwarded by the router and received by the downstream device;

(213) the downstream device sending an ACK packet in response, which is forwarded by the router and received by the upstream device.

In step 220, the router captures and buffers data sent from the downstream device. Step 221 comprises substeps of (221) the downstream device sends a data packet to the upstream device. This data packet is intercepted by the router, and stored in the router, and is not forwarded to the upstream device during step 220.

(222) the router sends an ACK packet to the downstream device in response to the data packet. This ACK packet is configured to appear to come from the upstream device.

Steps 221 and 222 are repeated until the router has sufficient information to make a determination as to whether the traffic is safe or malicious. This may be a fixed limit (e.g. a specified time period or number of packets), or may be the result of attempts to make a determination after each packet arrives, until a desired level of certainty is achieved.

In step 230, the router makes a determination as to whether the connection is safe or malicious, based on the stored data packets. This determination may be positive (231)—i.e. the traffic is considered safe and the connection is allowed, or negative (232) i.e. the traffic is considered malicious and the connection is blocked. It will be appreciated that the present disclosure is focused on the processes surrounding this determination, and not on the determination itself, so any suitable packet inspection or other tool for determining whether traffic is malicious or unwanted may be used. Further examples will be given later, as illustration only.

Focusing first on the case where the traffic is considered safe (i.e. FIG. 2A), in step 240 the router forwards the buffered data packets 4944 to the upstream device. Step 240 comprises substeps of:

(241) the router sending each data packet to the upstream device. This involves presenting the packets as if they have come from the downstream device without buffering and storage.

(242) the upstream device sending an ACK packet as acknowledgement of each data packet to the downstream device, which is intercepted by the router and not forwarded to the downstream device (which has already received acknowledgement of the packets).

Steps 241 and 242 are repeated for each of the buffered packets. If sending of a buffered packet in step 241 fails, then the connection can be recovered as specified in TCP protocols, with the router continuing to present packets as if it were the downstream device, and intercepting TCP error messages from the upstream device which relate to the buffered packets.

Any further packets received from the downstream device during this time may be added to the buffer queue, to be sent after the packets buffered in step 220.

In step 250, the connection is flagged as safe in the router, and any further traffic on the connection is passed directly to the "fast path" (e.g. ASIC) for processing, rather than being handled by the CPU.

Turning now to the case where the traffic is considered malicious (i.e. FIG. 2B), in step 260 the router may send substitute content to the downstream device. In the case where the TCP connection is transmitting HTTP traffic, this may be a substitute webpage notifying the user that the connection has been blocked, and the reasons why, and in the case where the TCP connection is transmitting traffic for a protocol with defined error messages, it may be a suitable error message in that protocol. In substeps 261 and 262, the data is transmitted by the router to the downstream device (appearing to originate from the upstream device) and acknowledged by the downstream device (with the router preventing any forwarding of such acknowledgement).

In step 270, the router terminates the connection by sending an RST packet to each of the downstream device (271) and upstream device (272), appearing to come from the other of the upstream or downstream device. The router then drops any further packets sent from the downstream device to the upstream device (273), or vice versa (274).

While the above has been presented as a single method, it will be appreciated that there are several improvements involved in the method (compared to typical user-mode packet filtering) which may be applied together or independently.

Firstly, there is the buffering of packets (220) prior to making a decision on the safety of the traffic (230), and the forwarding of those packets if the traffic is deemed safe (240). This ensures that the only communication between the LAN and WAN on a malicious TCP channel is the initial setup of the TCP channel (i.e. the SYN/ACK exchange). This is of particular importance in situations such as blocking communication between malware and a command and control server, preventing exfiltration of sensitive data from the LAN, or preventing receipt of malicious data by a device within the LAN—i.e. situations where any data transfer is potentially harmful. Buffering the packets prior to the decision being made allows them to be discarded if the TCP connection is deemed malicious, or to be transmitted with only a small delay if it is deemed safe.

Secondly, there is the use of substitute content if the TCP connection is deemed malicious. Depending on the application layer content of the TCP packets, this substitute content may be used to inform the user of the reasons for blocking the traffic (e.g. by providing a substitute website via HTTP), or to provide a more meaningful error to the program which initiated the connection (e.g. FTP 425 or FTP 426 reply codes—indicating a failure to make a connection). In some cases, substitute content which does not indicate an error may be used—e.g. where an attempt by malware to contact a command and control server is detected, a spoofed command may be returned to that malware if the command syntax is known. The use of substitute content does not rely on buffering—but to prevent clashes, if buffering is not used then any real return packets from the upstream device may be dropped.

Thirdly, there is the flagging of safe connections so that future traffic on that connection can be passed directly to the "fast path" processing of the router. This means that the majority of traffic (after the initial review to determine whether it is safe) can travel in the "fast path" via the ASIC rather than being processed primarily in the CPU, and as such results in significantly increased throughput compared to current network monitoring solutions in the router (~800 Mb/s on a gigabit router). This saving is achieved even if the packet monitoring is implemented in "user mode" on the CPU, rather than "kernel mode"—meaning that the software can deliver good throughput while still being easily portable to different models of router.

Figure 3:
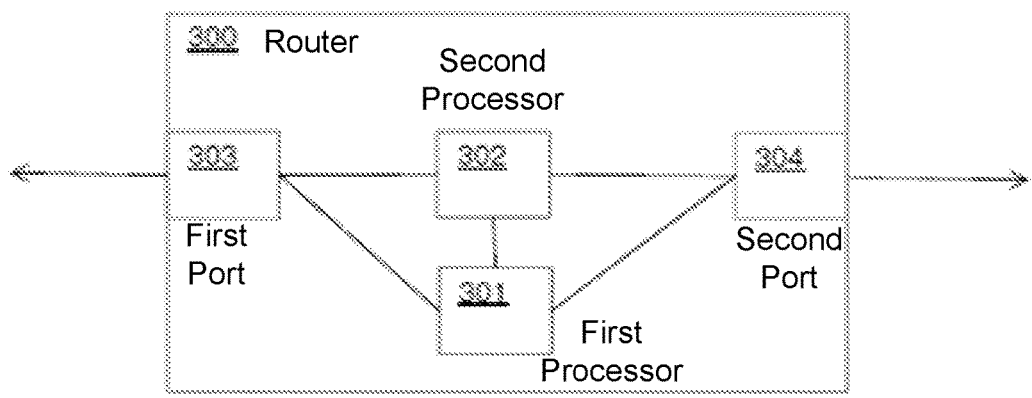
FIG. 3 is a schematic illustration of an example of a router.

FIG. 3 is a schematic illustration of a router implementing the above methods. The router 300 comprises a first processor 301 (e.g. the CPU) and a second processor 302 (e.g. the ASIC). The router further comprises first and second ports 303, 304, configured to connect to first and second networks.

The first processor is configured to, after establishment of a TCP connection between a first device on the first network and a second device on the second network:
- receive a plurality of data packets sent from the first device over the TCP connection;
- acknowledge each received data packet by sending an ACK packet to the first device;
- store said data packets without sending them to the second device;
- examine the stored data packets in order to determine whether to block or allow the TCP connection;
- in the event that it is determined to allow the TCP connection:
  - send each of the stored data packets to the second device;
- in the event that it is determined to block the TCP connection:
  - send a TCP RST message to each of the first and second devices in order to close the TCP connection.

The first processor may be further configured to, in the event that it is determined to allow the TCP connection, pass any further packets on the TCP connection to the second processor (i.e. the "fast path").

The invention claimed is:

1. A method of monitoring traffic, the method being carried out by a router acting as a gateway between a first and second network, the method comprising:
   after establishment of a transmission control protocol (TCP) connection between a first device on the first network and a second device on the second network, the router comprising a first processor and a second processor:
   on the first processor:
   receiving a plurality of data packets sent from the first device over the TCP connection;
   sending a TCP acknowledgement (ACK) packet to the first device in response to each data packet of the plurality of data packets;
   storing said data packets without sending them to the second device;
   examining at least part of the plurality of the stored data packets in order to determine whether to block or allow the TCP connection;
   in the event that it is determined to allow the TCP connection:
   sending each of the stored data packets to the second device;
   in the event that it is determined to block the TCP connection:
   sending a TCP reset (RST) message to each of the first and second devices in order to close the TCP connection; and
   in the event that it is determined to allow the TCP connection, handling subsequent data packets of the TCP connection by forwarding data packets between a first port and a second port via the second processor, wherein the subsequent data packets of the TCP connection omit the first processor based at least in part on the determination to allow the TCP connection.

2. The method according to claim 1, wherein the steps of claim 1 are performed on the first processor, and comprising, in the event that it is determined to allow the TCP connection, handling the subsequent data packets of the TCP connection via the second processor.

3. The method according to claim 1, and comprising, in the event that it is determined to block the TCP connection, sending a substitute response to the first device via the TCP connection prior to sending the TCP RST message, the substitute response containing one or more data packets using the same application layer protocol as the stored data packets.

4. The method according to claim 1, and comprising, in the event that it is determined to block the TCP connection, discarding the stored data packets.

5. The method according to claim 1, and comprising, following sending of the TCP RST message, preventing forwarding of any further data packets between the first and second device.

6. A router comprising:
   a first port configured to connect to a first network;
   a second port configured to connect to a second network;
   a first hardware processor and a second hardware processor;
   a hardware memory unit for storing data;
   the first hardware processor configured to:
   after establishment of a transmission control protocol (TCP) connection between a first device on the first network and a second device on the second network:
   receive a plurality of data packets sent from the first device over the TCP connection;
   send a TCP acknowledgement (ACK) packet to the first device in response to each data packet of the plurality of data packets;
   store said data packets in the hardware memory unit without sending them to the second device;
   examine the stored data packets in order to determine whether to block or allow the TCP connection;
   in the event that it is determined to allow the TCP connection:
   send each of the stored data packets to the second device;
   in the event that it is determined to block the TCP connection:
   send a TCP reset (RST) message to each of the first and second devices in order to close the TCP connection; and
   in the event that it is determined to allow the TCP connection, handle subsequent data packets of the TCP connection by forwarding the data packets between the first and the second port via the second hardware processor, wherein the subsequent data packets of the TCP connection omit the first hardware processor based at least in part on the determination to allow the TCP connection.

7. The router according to claim 6, wherein the second hardware processor configured to forward the data packets between the first and second port, wherein the router is configured to handle data packets using the second hardware processor for the TCP connection following the determination at the first hardware processor to allow that TCP connection.

8. The router according to claim 6, wherein the second hardware processor is configured to have a faster processing speed than the first hardware processor.

9. The router according to claim 6, wherein the first hardware processor is a central processing unit (CPU) and the second hardware processor is an application specification integrated circuit (ASIC).

* * * * *